United States Patent [19]

Russell

[11] Patent Number: 4,888,541

[45] Date of Patent: Dec. 19, 1989

[54] METHOD AND APPARATUS FOR CONTROLLING STEPMOTOR MECHANICAL DRIVES

[76] Inventor: Jack Russell, 1019 Harms Ave., Libertyville, Ill. 60048

[21] Appl. No.: 113,176

[22] Filed: Oct. 23, 1987

[51] Int. Cl.$^4$ ............................................. H02P 8/00
[52] U.S. Cl. ................................... 318/696; 318/685
[58] Field of Search ................. 318/696, 685; 368/157

[56] References Cited

U.S. PATENT DOCUMENTS

| | | | |
|---|---|---|---|
| 4,074,179 | 2/1978 | Kuo et al. ............................. | 318/696 |
| 4,192,131 | 3/1980 | Hosakawa et al. .................. | 368/157 |
| 4,663,576 | 5/1987 | Scqvola et al. ...................... | 318/685 |

OTHER PUBLICATIONS

Fifth Annual Symposium Incremental Motion Control, May, 1976, p. CC–1, J. R. Frus and B. C. Kuo, "Closed–Loop Control of Step Motion without Feedback Insiders."

Primary Examiner—William M. Shoop, Jr.
Assistant Examiner—Saul M. Bergmann

[57] ABSTRACT

A method and apparatus for controlling stepmotors having a broad range of applications including fuel control for gas-turbine engines, and operating powered automatically controlled doors for mass transit vehicles is disclosed. Step motor control through analysis of the motor winding currents during application of controlled voltage pulse provides a basis for evaluating shaft torque conditions at the motor load without return or feedback signals from the driven load. This type of current analysis utilizing digital techniques provides a convenient, reliable, and economical means for detecting stepmotor output shaft position and loading. Detection and recognition of output shaft load or drive requirements is then utilized in a control system wherein functional requirements of the system including motion and/or torque requirements of the shaft output load can be controlled in accordance with desired system operation. A control algorithm based on earlier determined stepper current characteristics is utilized in evaluating any particular stepper motor at any time during operation.

Digital techniques utilize the aforementioned algorithm sample stepper motor current, measure and detect predetermined time based values of motor current, thereby providing a basis for evaluating stepper motor shaft loading during each step corresponding to and initiated by a voltage pulse.

12 Claims, 17 Drawing Sheets

TYPICAL DATA (TOTAL INSTANTANEOUS MOTOR I):

| TIME AND LOOK NUMBER | t1 / 1 | t2 / 2 | t3 / 3 | t4 / 4 | t5 / 5 | t6 / 6 | t7 / 7 | t8 / 8 | t9 / 9 | ... | t32 / 32 | t33 / 33 |
|---|---|---|---|---|---|---|---|---|---|---|---|---|
| DATA | 39 | 86 | 47 | 65 | 47 | 61 | 55 | 57 | 55 | | 60 | |
| FIRST WINDOW | A | B | C | D | E | | | | | | | |
| SECOND WINDOW | | A | B | C | D | E | | | | | | |
| THIRD WINDOW | | | A | B | C | D | E | | | | | |
| ... | | | | | | | | | | | | |
| THIRTY-SECOND WINDOW | | | | | | | | | | | AB → | D E |

| | t128 / 128 |
|---|---|
| | 56 |

FIG. 1a

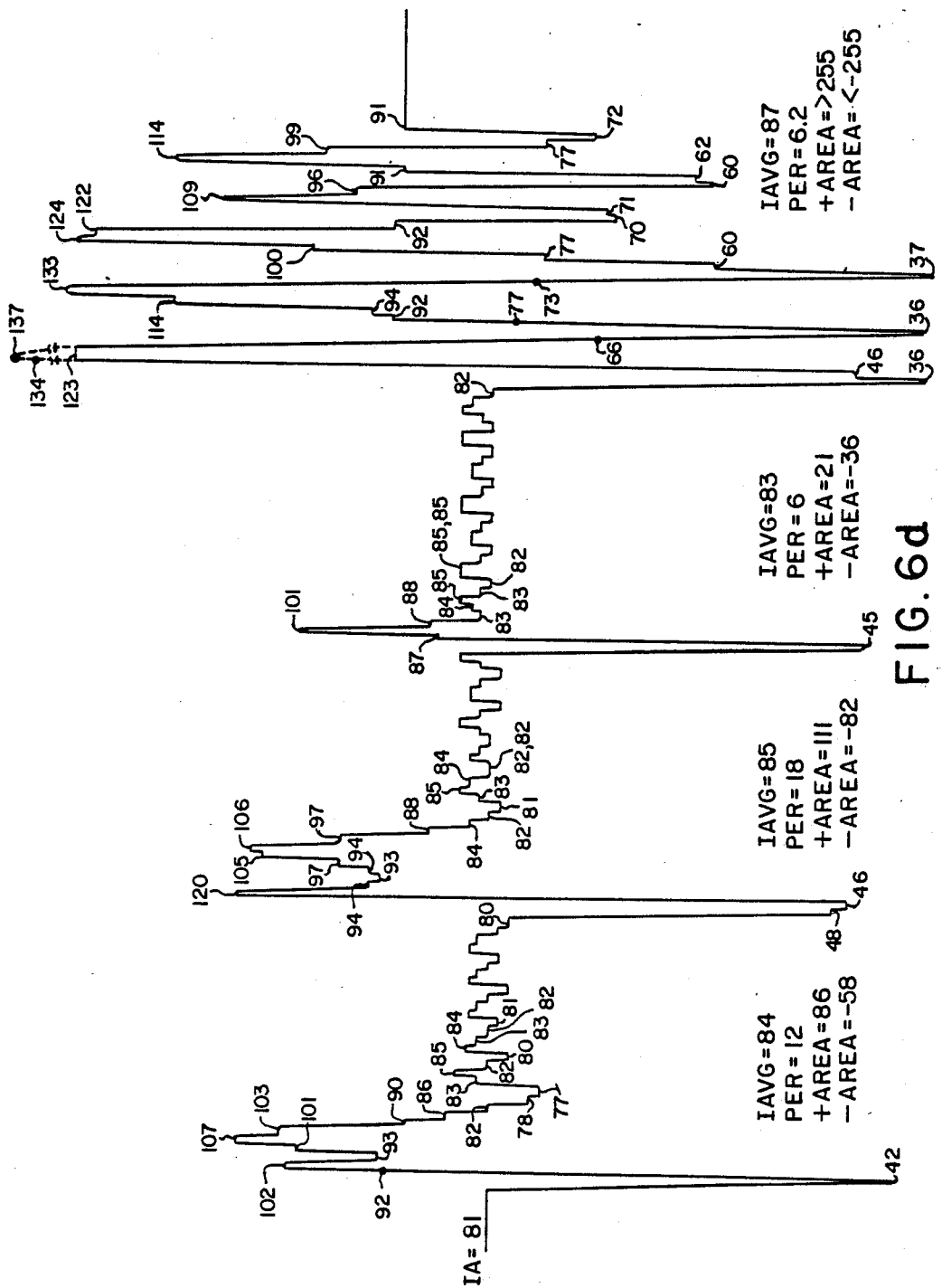

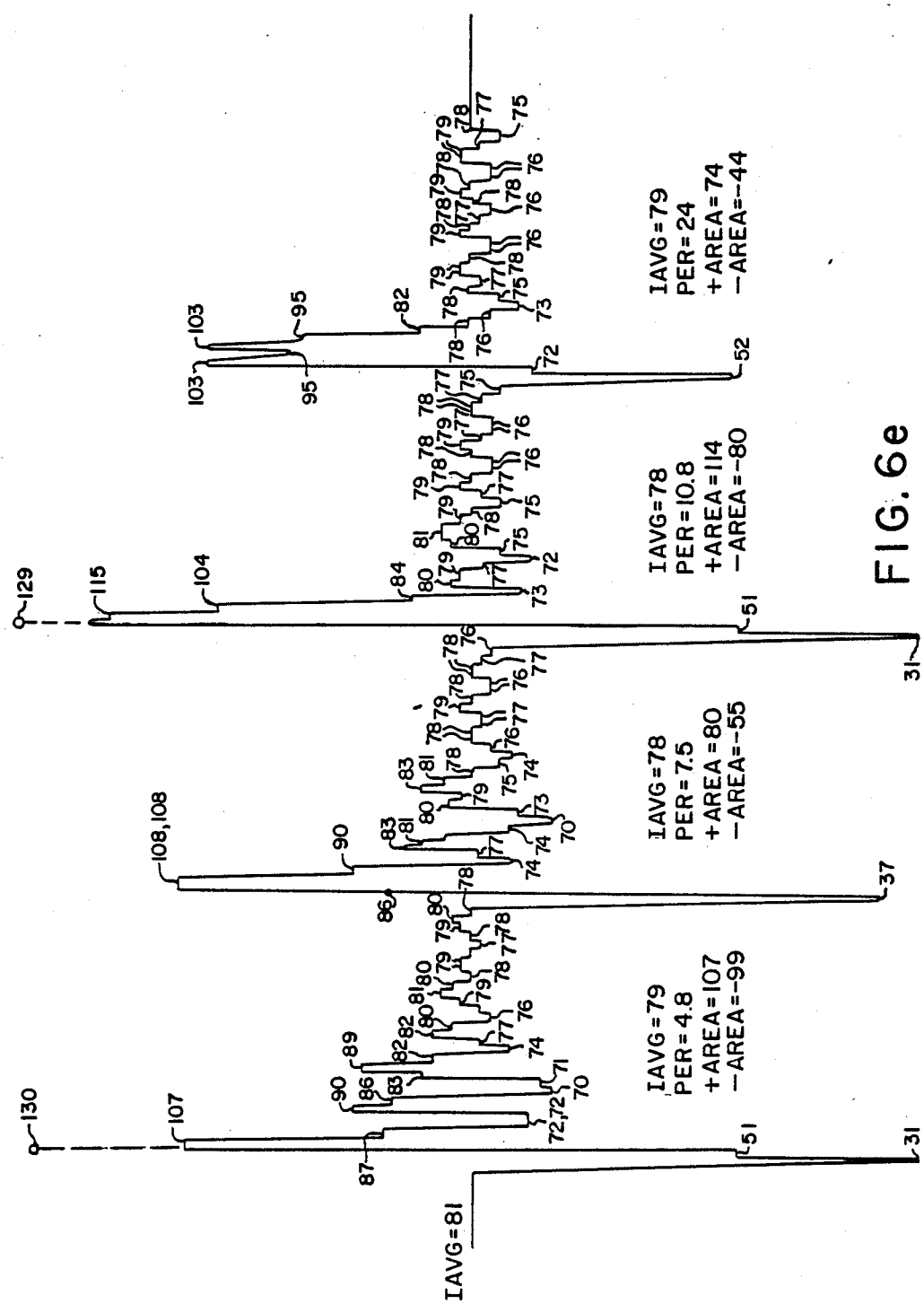

TYPICAL CURRENT WAVEFORM HAVING A CURRENT PEAK

DIGITAL REPRESENTATION OF CURRENT WAVE OF FIG. 7

METHOD AND APPARATUS FOR CONTROLLING STEPMOTOR MECHANICAL DRIVES

BACKGROUND OF THE INVENTION

This invention relates generally to stepmotor drive, and systems utilizing stepmotor drive, and more particularly concerns controlling stepmotors of the permanent magnet type having a permanent magnet disc rotor.

Step motors are commonly used to mechanically drive devices such as the pick up heads for computer magnetic disc storage drives. A less common application of stepmotors is in actuating fluid control valves, typically having a ball or other fluid closure member, and in substantially larger horsepower ratings, furnishing rotary torque for power operated doors typically as used on mass transit vehicles such as subway cars.

Applications of the latter type are disclosed in U. S. Pat. No. 4,511,832, wherein the stepmotor drive is controlled by counting pulses applied to the stepmotor and comparing the number of pulses applied to the drive motor windings with a count of the drive motor shaft rotation in order to detect any obstruction or failure of the rotor to move.

In applications of the type contemplated by the invention disclosed herein, it is often inconvenient, difficult and expensive, or impossible to measure the stepmotor rotor movement or obtain other shaft position data at the point of application of torque load. In the case of actuating a vehicular power door, rotation of the drive motor shaft may not supply vital information relating to output shaft load requirements, in that failure of other mechanical portions of the drive system such as a fractured actuating arm or drive belt will not be reflected in the motion of the drive motor itself. Therefore, more sophisticated information regarding the shaft torque loading is necessary.

In the stepmotor operation of a rotating valve, similar failures in the mechanical drive train such as stripped gears, and/or broken gear shafts, may not be reflected in stepmotor shaft counts, rendering this type of drive system control highly unreliable, and again requiring sophisticated information as to shaft torques encountered in each operation.

Therefore it is an object of this invention to provide a stepmotor drive and control system wherein shaft load variations are monitored and analyzed in real time in order to make appropriate changes in the system drive motor actuating need.

It is a further object of this invention to provide a method of analyzing drive motor current signatures in response to applied voltage pulses wherein instantaneous information relating to output shaft loading can be compared to predetermined characteristics and limits.

It is an additional object of this invention to provide a stepmotor drive system wherein motor winding signatures are analyzed using a "SIGNALYSIS" algorithm for rapid and accurate recognition/determination of unexpected shaft loading conditions.

It is yet a further object of this invention to provide a stepmotor drive system wherein the position of the stepmotor output shaft can be obtained from predetermined or continuously varying system input data.

SUMMARY OF THE INVENTION

In accordance with applicants invention disclosed herein, a stepmotor control system and winding current analysis is provided wherein stepmotor shaft torques encountered on application of drive voltage pulses are measured and identified through the use of an algorithm. As disclosed the algorithm provides a means for real time analysis of stepmotor winding currents which are determinative of shaft torque loads and/or other conditions present in the load actuated by the stepmotor whose currents are measured and analyzed.

Applicant has discovered that for a given stepmotor applied pulse, "typical" and reliably repeatable current transients are present in the winding currents. Applicant has further related certain salient aspects of this current transient to shaft torques encountered in stepmotor drive situations. These shaft load conditions typically include a completed or "made" step in response to an applied voltage, and a missed or incomplete step and response to the same voltage. Other variations have also been identified such as partial shaft load, a varying obstruction in the drive output or transient shaft load, and a defective drive system.

Applicants method of analyzing stepmotor winding current signatures, termed "SIGNALYSIS" includes measurement and identification of typical transient current patterns including negative peaks, positive peaks, and negative and positive steps in the current wave form. Measurement of these steps for typical valve operation are incorporated into an algorithm which on substitution of the aforementioned and predetermined salient characteristics of a given wave form yields information relating to the output shaft loading. This information provides the basis for performing control actions in a system, or can result in other actions such as an alarm or other changes in order to adjust the overall system to accommodate the unforeseen circumstance. Exceptions to expected operation can be stored for comparison to measured values in order to predict future performance.

In a preferred embodiment, applicants system is utilized in stepmotor drive of a fuel controlled valve for internal combustion engines. Typically, this type valve employs a ball-type closure member requiring approximately 400 steps per 90 degree rotation of the ball closure member, i.e., from open to close or close to open.

In an alternate embodiment, stepmotor drive of a power door operator of the type disclosed in U. S. Pat. No. 4,142,326, hereby incorporated by reference, is contemplated. This type of system utilizes stepmotors of substantially increased horsepower. However, the advantages provided by applicants invention is equally advantageous in that identification of operation of a stepmotor driven load is of crucial importance in movement of a vehicular door from open to close. In this case, involving considerations of passenger safety, early identification of unexpected shaft loads such as that presented by failures in other portions of the system, and/or incomplete actuation of a passenger door are significant advances in the art of power door control.

BRIEF DESCRIPTION OF THE DRAWINGS

Other objects and advantages of the method and apparatus for controlling stepmotor drives utilizing drive motor current signatures will become apparent on reading the following detailed description and upon reference to the drawings, in which.

FIG.a is a time based matrix representation of the motor current measurement recording method as used in the disclosed invention, particularly showing windows of current measurement in relation to "looks" or samples of current characteristics, for use in the algorithm disclosed.

Figure 2:
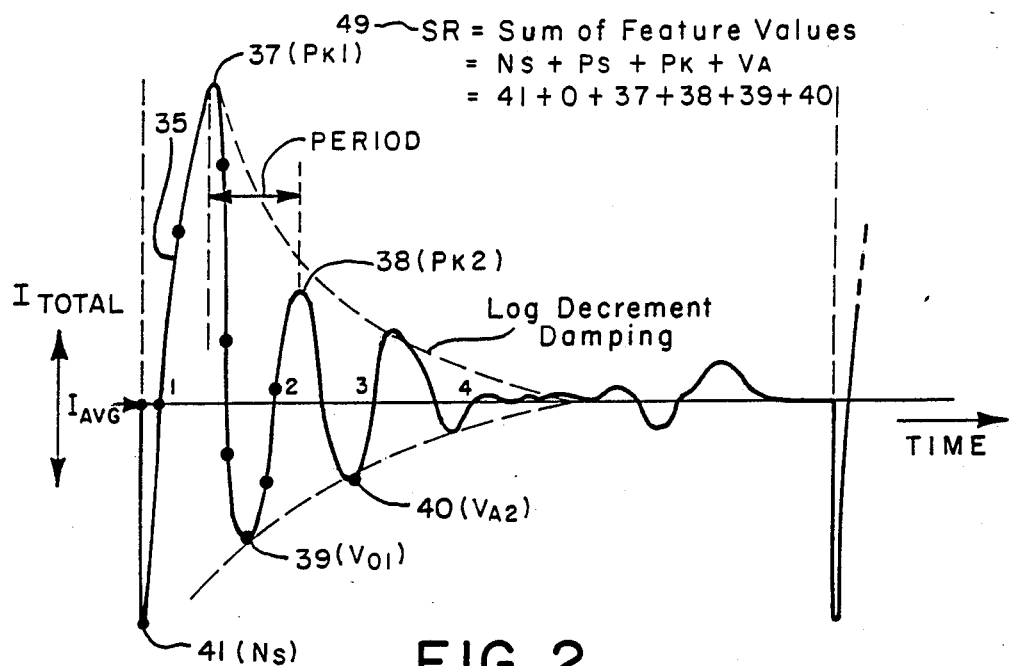

FIG. 2 is a semi-schematic drawing of a typical stepmotor current wave form for a complete or "made" step, particularly showing the (salient) significant values and locations on the current wave utilized in the disclosed current signature analysis.

Figure 3:
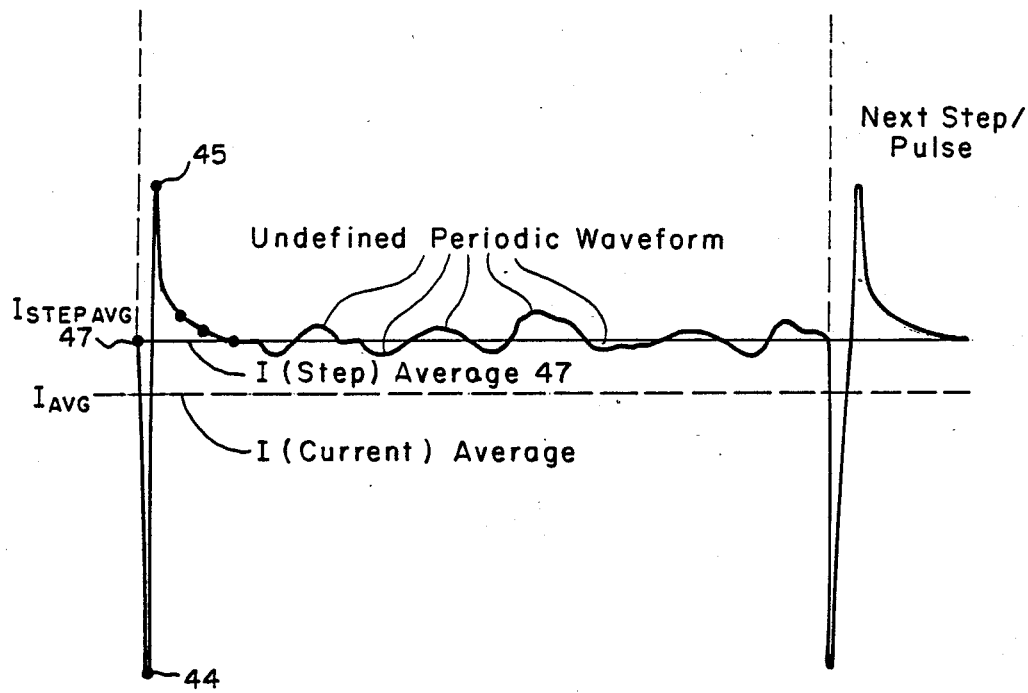

FIG. 3 is a semi-schematic drawing of a typical transient stepmotor current response to a voltage pulse for a typical "missed" or incomplete step, particularly showing the (salient) significant locations and values of the current wave form utilized in the disclosed current signature analysis.

Figure 4:
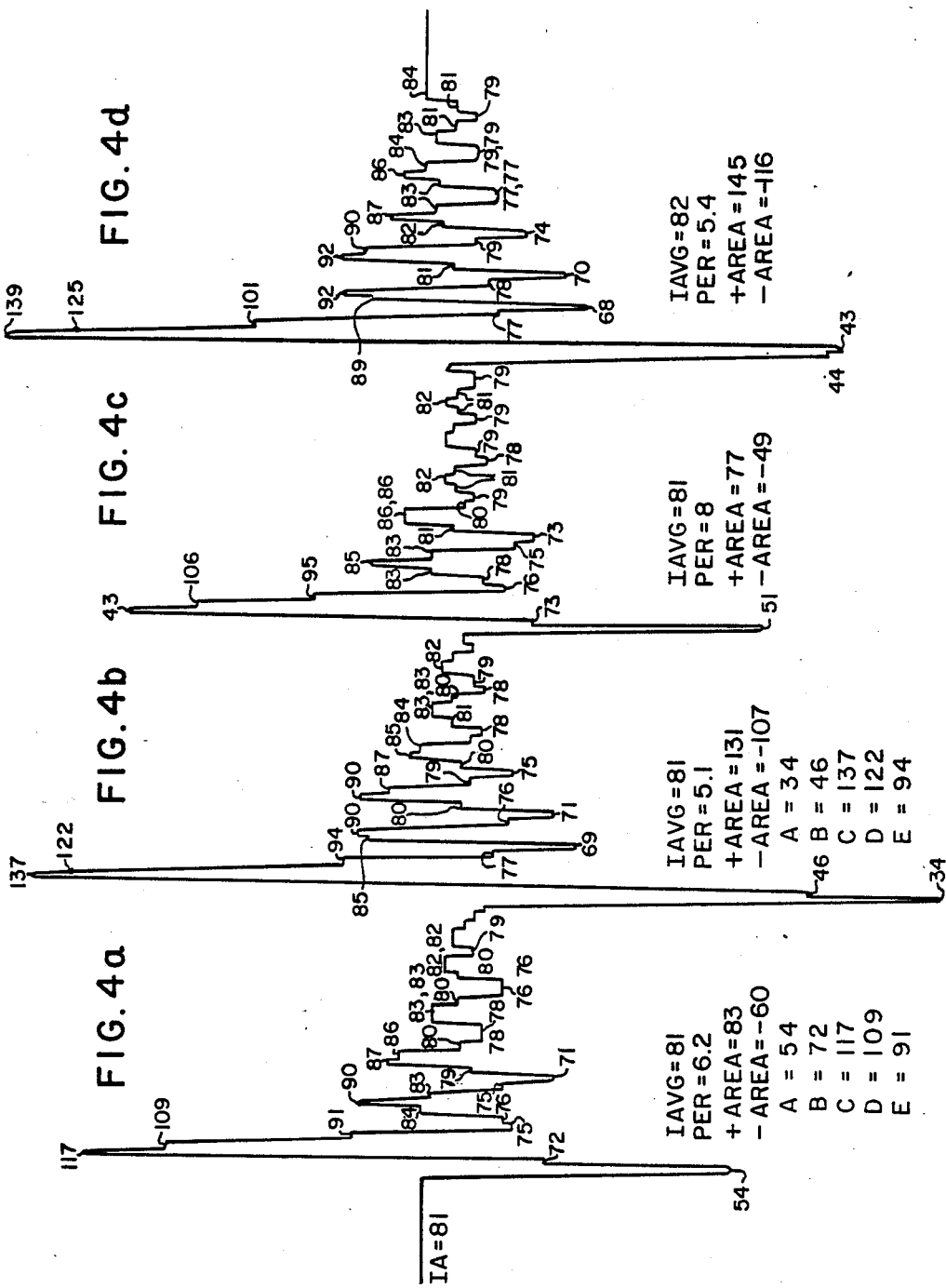

FIG. 4 is a typical semi-schematic transient current wave form in digitized form showing four digitized pulse steps for a typical stepmotor driven valve opening operation, particularly showing weighted current signature values used to determine characteristics as utilized in the disclosed analysis.

Figure 5:
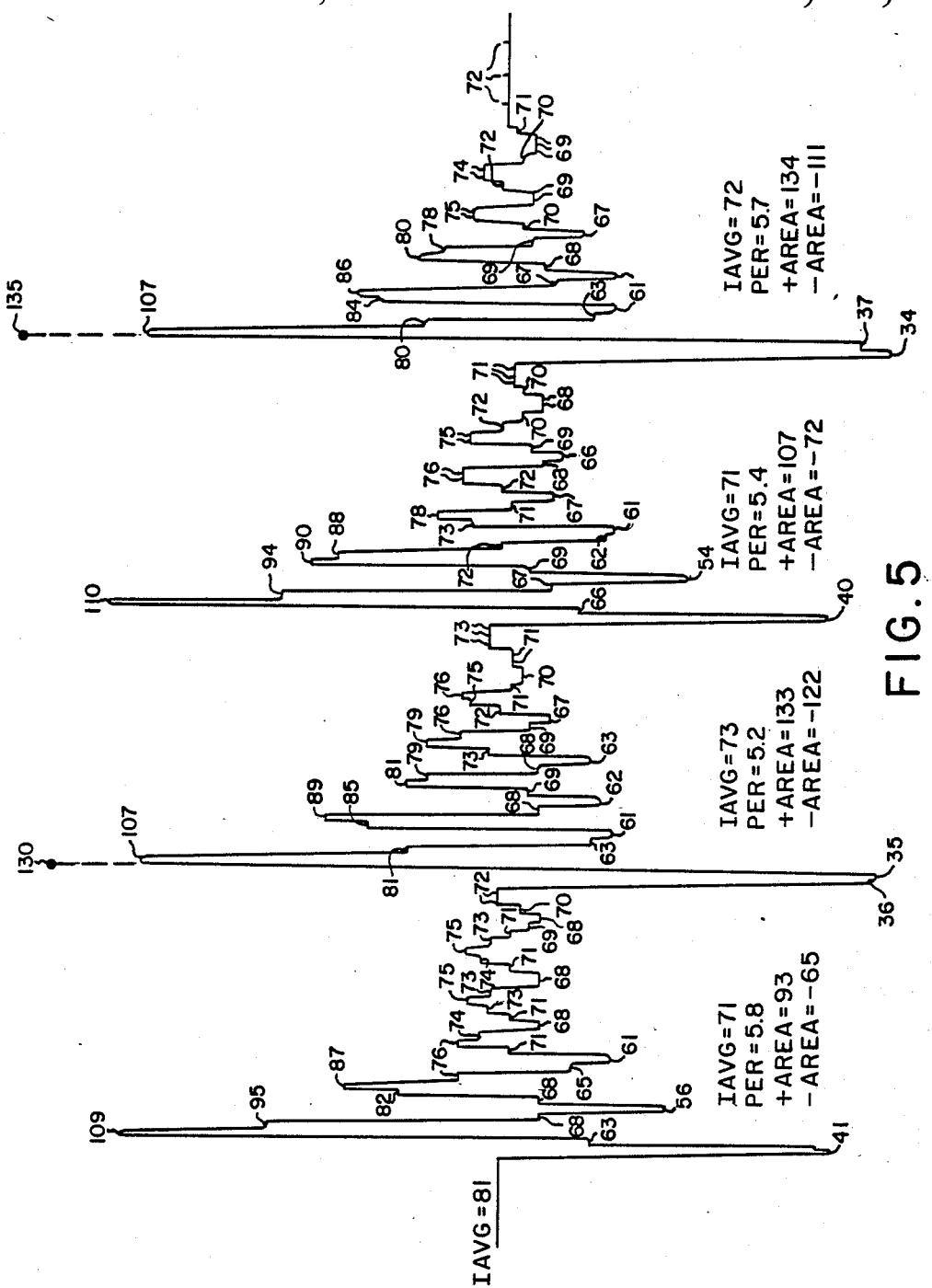

FIG. 5 is a typical digitized representation of the four pulse current analysis similar to FIG. 4, particularly showing values of the digitized current utilized in the algorithm of the disclosed current signature analysis in the valve opening direction and for stepmotor reversal and a full valve closure member movement from closed to open.

Figure 6:
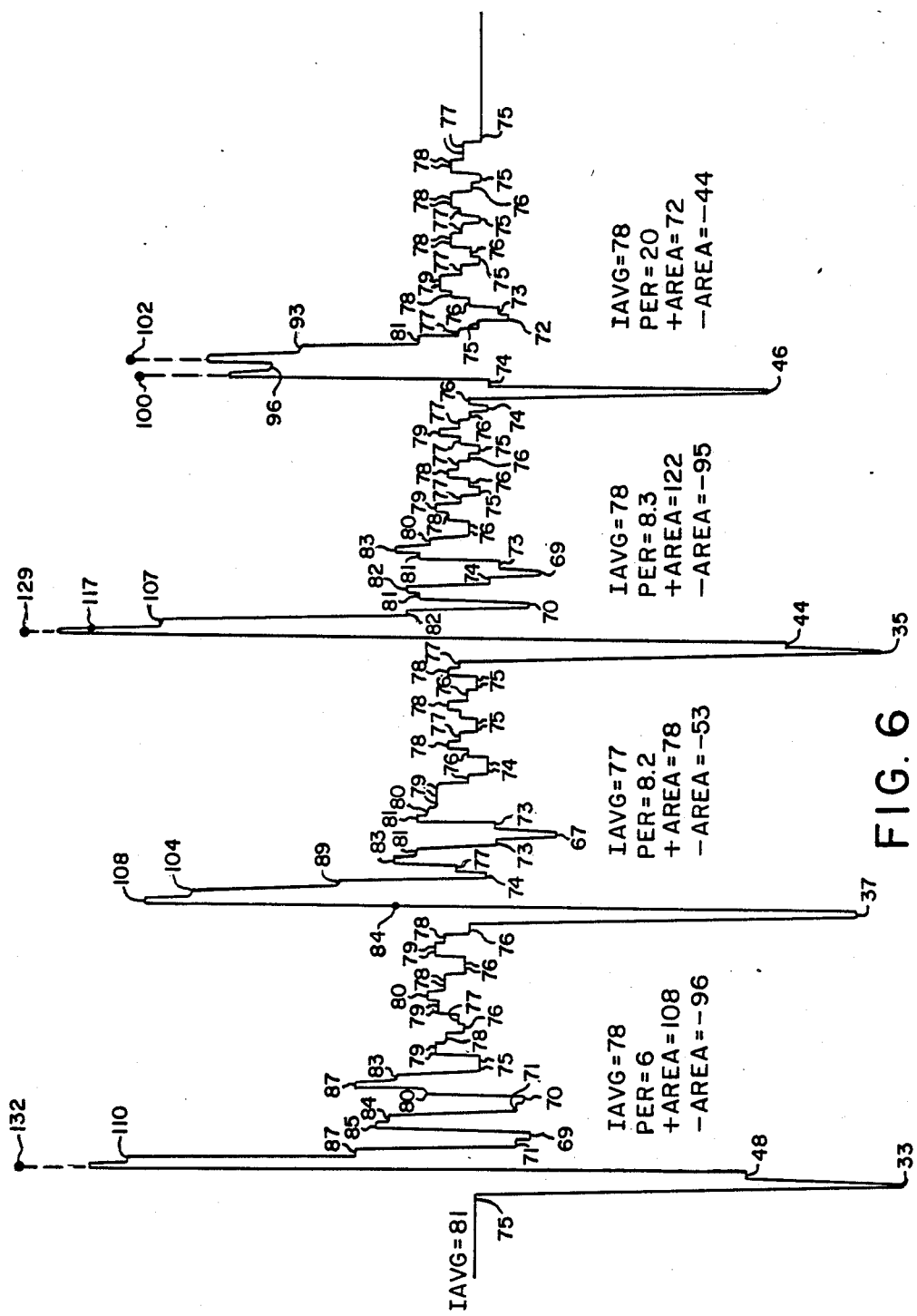

FIG. 6 is a semi-schematic, digitized stepmotor current transient for a stepmotor driven valve opening operation in four motor steps, and particularly showing the current signature for a loaded valve closure member contacting an end or valve stop on an opening motion of the closure member.

Figure 6A:
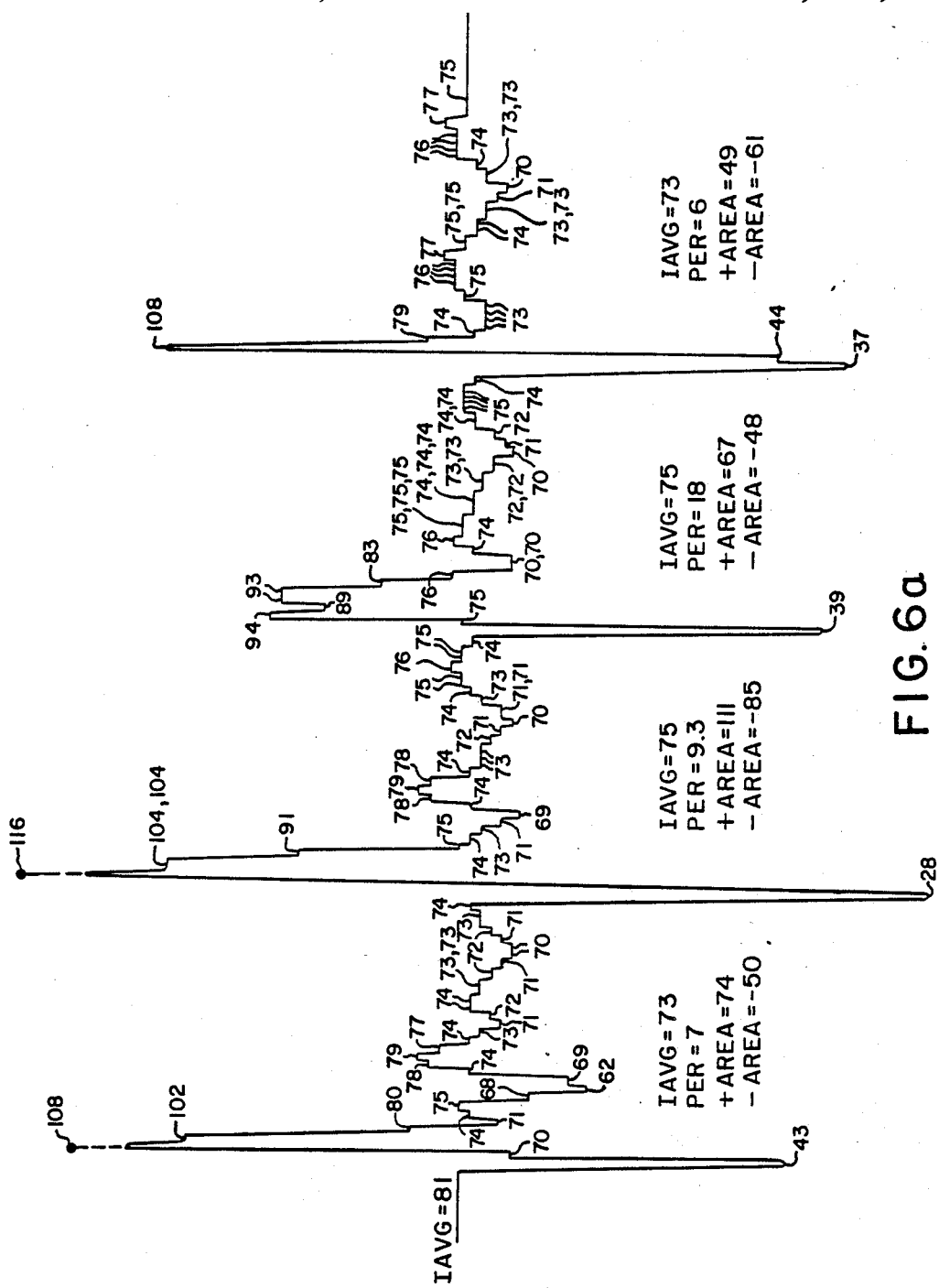

FIG. 6a is a semi-schematic digitized stepmotor current transient for a valve operation similar to that of FIG. 6 and particularly showing current signatures when the valve closure member is locked on reaching its full travel or open position.

Figure 6B:
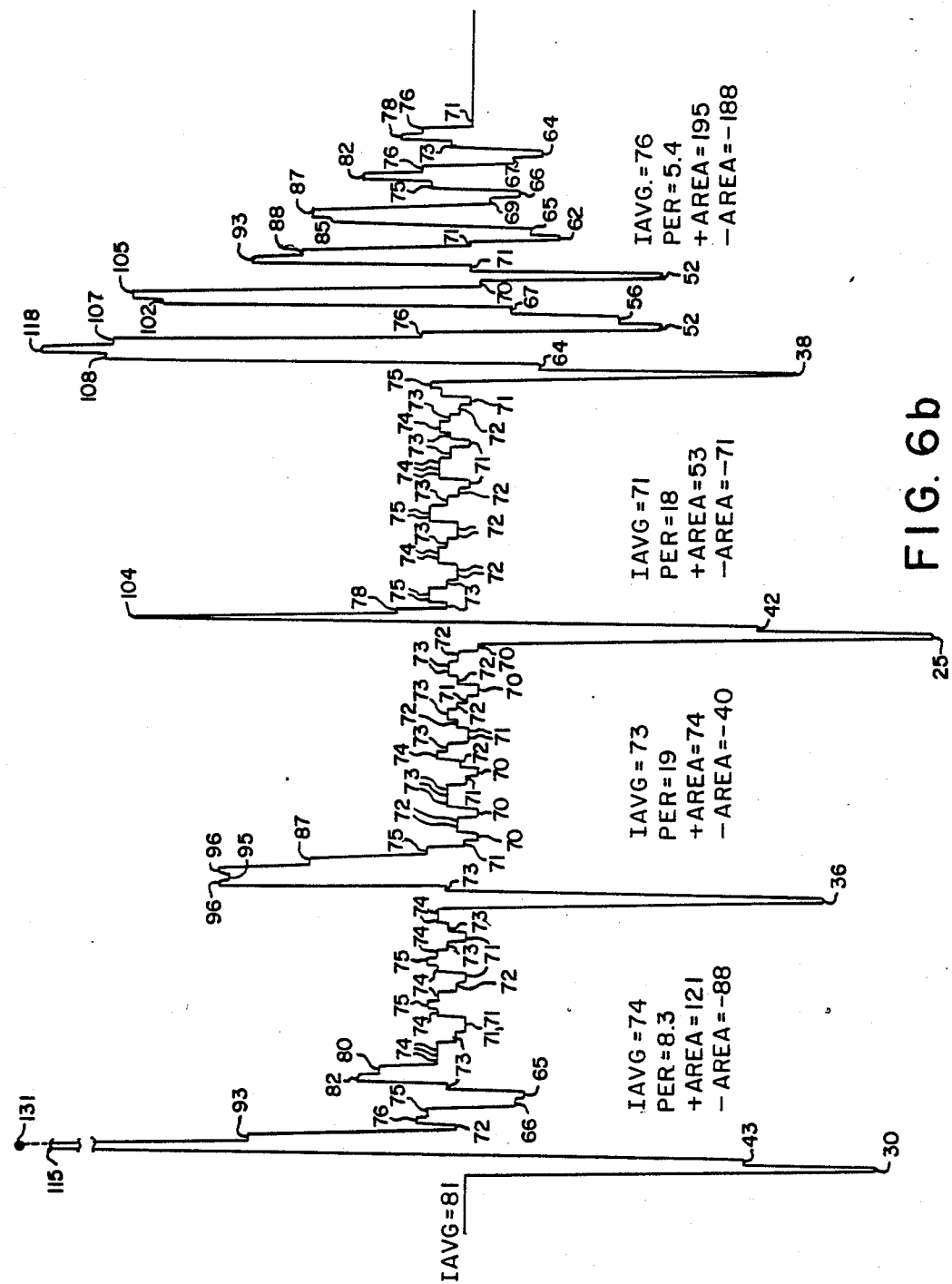

FIG. 6b is a semi-schematic digitized stepmotor current transient for the stepmotor driven valve combination of FIGS. 6 and 6a wherein the valve closure member contacts a non-resilient midstroke obstruction.

Figure 6C:
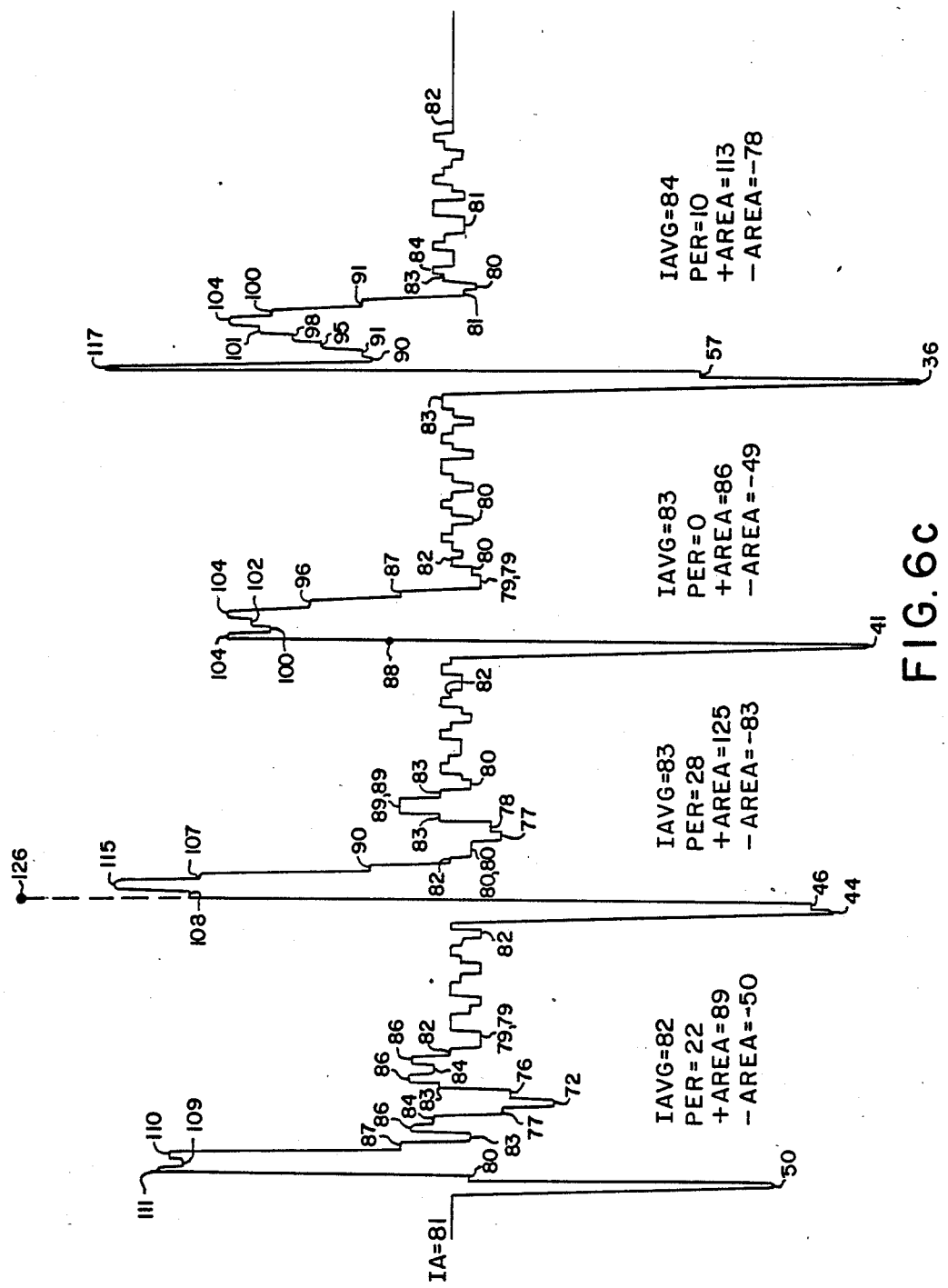

FIG. 6c is a semi-schematic digitized stepmotor current transient for the stepmotor driven valve combination of FIGS. 6, 6a and 6b, wherein the valve closure member is torque loaded and encounters a resilient end of closing motion stop.

FIG. 6d is a semi-schematic digitized stepmotor current transient for the stepmotor driven valve combination of FIG. 6c wherein the valve driving gears have uncoupled.

FIG. 6e is a semi-schematic digitized stepmotor current transient representation for the stepmotor/valve combination of FIG. 6 wherein the valve closure member is moving in the opening direction and the valve closure member has contacted a normal resilient stop.

Figure 7:
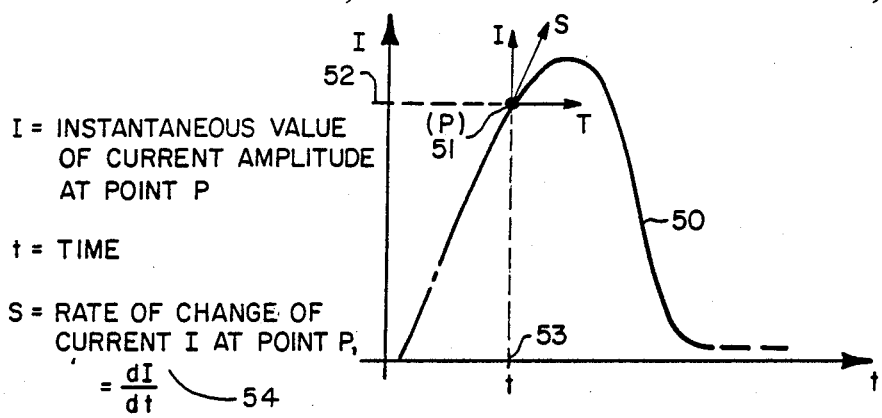
Figure 7A:
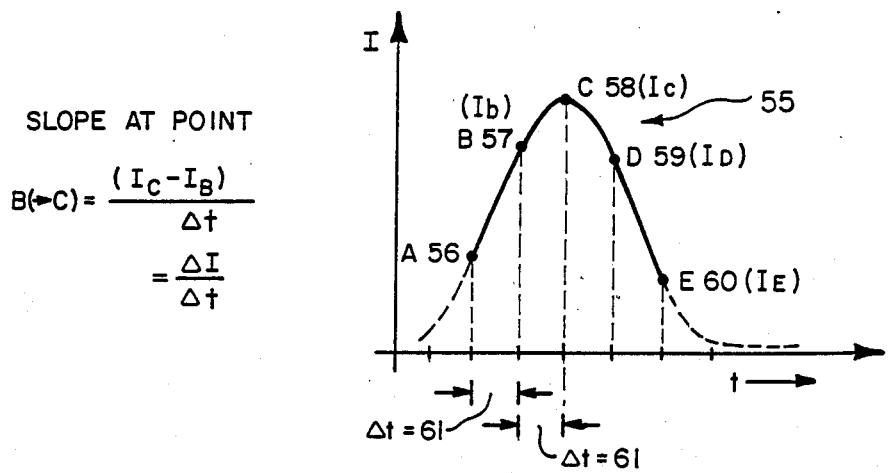

FIGS. 7 and 7a, show the analytical basis for the stepmotor current signature analysis of the invention, i.e., the "SIGNALYSIS" algorithm, particularly showing analysis performed in designated portion of the stepmotor current transients typically as shown and identified on FIGS. 6, 6a, 6b, 6c and 6d in order to evaluate a single current step of the type shown in FIGS. 2 and 3, and demonstrated for the conditions of FIGS. 4, 5 and 6.

FIGS. 7b, 7c, 7d and 7e are block diagrams of the "SIGNALYSIS" algorithm of the invention particularly showing the "FEATURE EXTRACTION" analysis of the "TYPICAL" current steps of FIG. 4 in order to evaluate predetermined features of stepmotor current.

Figure 8:
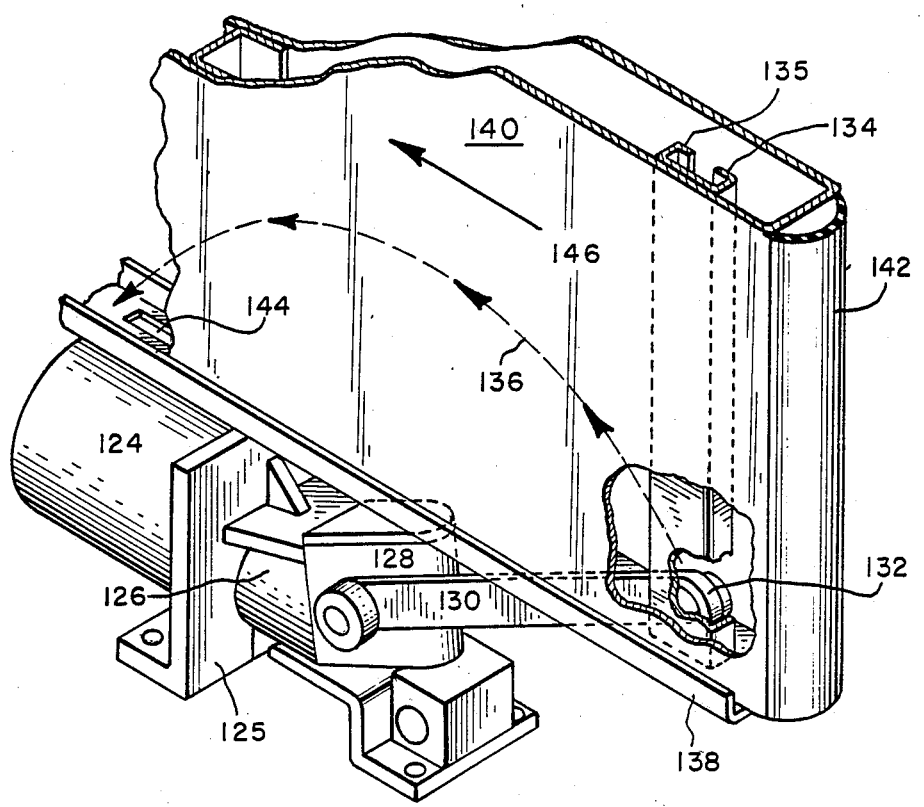

FIG. 8 is a semi-pictorial representation of an alternate embodiment of the invention, particularly showing the operative portion of the stepmotor drive in a vehicular power door operator.

DETAILED DESCRIPTION OF THE INVENTION

Figure 1:
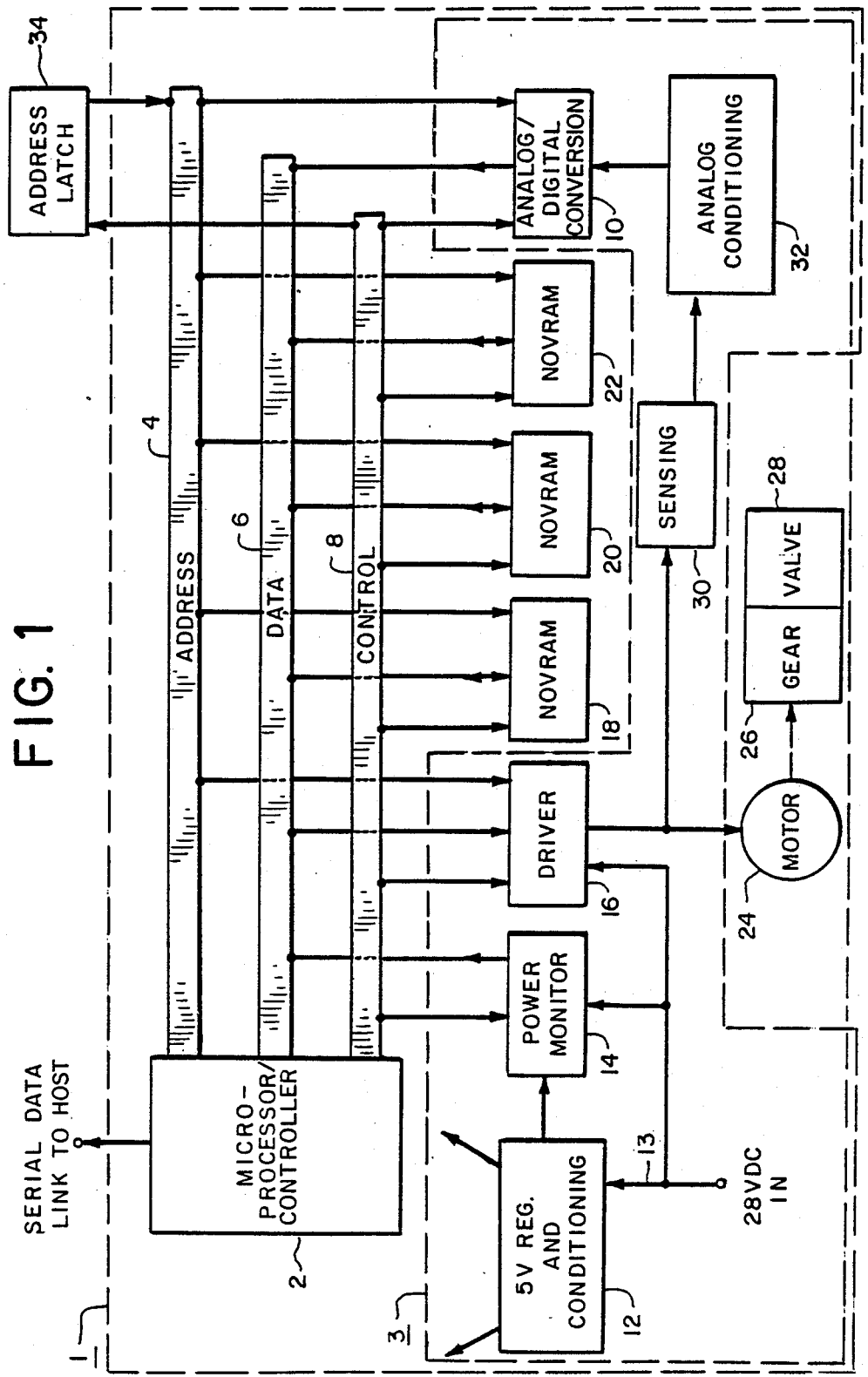
FIG. 1 is a block diagram of the preferred embodiment of the invention particularly showing a microprocessor/controller and associated stepmotor drive and control functions.

With reference to FIG. 1 there is shown a semischematic block diagram of the preferred embodiment of the invention comprising a stepmotor controller 1 as indicated in the dotted outline, having a microcontroller to address bus 4, a data bus 6, and a control bus 8. The above mentioned microcontroller communicates and acts in a control mode with a pulse motor driver 16 three non-volatile random access memories 18, 20 and 22, i.e., NOVRAMS and an analog/digital conversion function 10. Address latch 34 further communicates with bus 8 and address bus 4. Two of novrams 18, 20, 22 maybe other forms and combinations of RAM and ROM. It is essential to retain at least one non-volatile memory.

The driven portion of the preferred embodiment of the invention, as indicated in the dotted outline, comprises a voltage input regulator and conditioning function 12 applied with a suitable input voltage via voltage source 13, in this case 28 volts DC. The voltage source 13 also provides power input to the power monitor 14 and the driver 16. The driver utilized is of the constant current type providing predetermined average constant current through pulse modulation.

The driven system consists of a pulse motor 24 operating a valve 28 through a gear set 26. Current to the stepmotor 24 is sensed by sensing function 30. The sensed current in analog form is transmitted to the analog conditioning function 32 and communicates with the above mentioned address bus 4 databus 6, and control bus 8 via analog/digital conversion function 10.

In keeping with the concepts of the invention disclosed herein the analog motor current signals supplied to the micro-controller 2 via the address, data, and control bus are analyzed for current signatures utilizing SIGNALYSIS consisting of a FEATURE EXTRACTION, and STEP DECISION portions. These functions to be covered in substantial detail below are accomplished within the microprocessor/controller 2 and associated control and signal conditioning devices disclosed as the controlled or operating portion 3 as shown in FIG. 1.

Although the invention of this disclosure is shown in a preferred embodiment of a stepmotor driven valve, those skilled in the control arts will readily understand that operation of any shaft driven device requiring stepmotor control could as well benefit from the advantages of the novel control system utilizing stepmotor current SIGNALYSIS. In the alternate embodiment of the invention, there is disclosed a power door system, incorporating the invention disclosed herein wherein obstruction sensing, and/or failure of associated power door components can be easily be detected through SIGNALYSIS.

Applicants novel approach to digital analysis of stepmotor wave forms, i.e., SIGNALYSIS, is best understood with initial reference to FIG. 7, wherein a portion of a typical continuous or analog current wave form 50 is shown. With further reference and respect to earlier mentioned FIG. 2, the wave form 50 of FIG. 7 is one peak of the wave form 35 having a peak 37 as shown in FIG. 2. In order to best describe applicants inventive concept, a point 51 (P) on the wave form 50 corresponds to a stepmotor current value 52 at time 53. As those skilled in the analytical arts will readily recognize, the rate of change of current 50 at point 51 can be described as its time derivative, i.e., dI/dt. Therefore the instantaneous rate of change of stepmotor current at the point 51 or dI/dt 54. Applicants approach to stepmotor wave form analysis involves the discovery that utilizing the digitized version 55 of the wave form 50 as shown on FIG. 7a provides a means for analysis of a transient current wave through the use of amplitude values only. As indicated on FIG. 7a and as those skilled in the analytical arts will further recognize, the continuous derivative can be replaced by differentials or incremental changes in the wave form. Therefore, with reference to FIG. 7a, the wave form 55 is further defined by 5 current amplitude levels 56 (A), 57 (B), 58 (C), 59 (D) and 60 (E). The above mentioned amplitudes of 55 are discreet measurements taken at equal intervals of time $\Delta t$ or 61 as shown. Therefore, typically the rate of change of current 55 between values of current 57 and 58 can be represented by the difference in current between 57 and 58 arithmetically divided by the increment of time 61 has shown. If the current amplitude sensing is continued on an equal time between samples basis, for the purposes of defining an arbitrary current time wave form, such as 55 of FIG. 7a, the rates of change of current at any desired location along the wave form and in particular the typical digitized wave form 55 can be shown by:

$$dI/dt = \frac{(Ic - Ib)}{\Delta t}$$
$$= \frac{\Delta I}{\Delta t}$$

As indicated above, as the sampling periods are identical from the above shown current points of 56, 57, 58, 59 and 60, the slopes or -rates of change of current 52 are then accurately represented on a relative basis by the current differences between successive points or:

$$di/dt = \frac{\Delta Ia - b}{\Delta t} ; \frac{\Delta Ib - c}{\Delta t} ; \frac{\Delta Ic - d}{\Delta t} ; \frac{\Delta ID - E}{\Delta t}$$

Figure 7B:
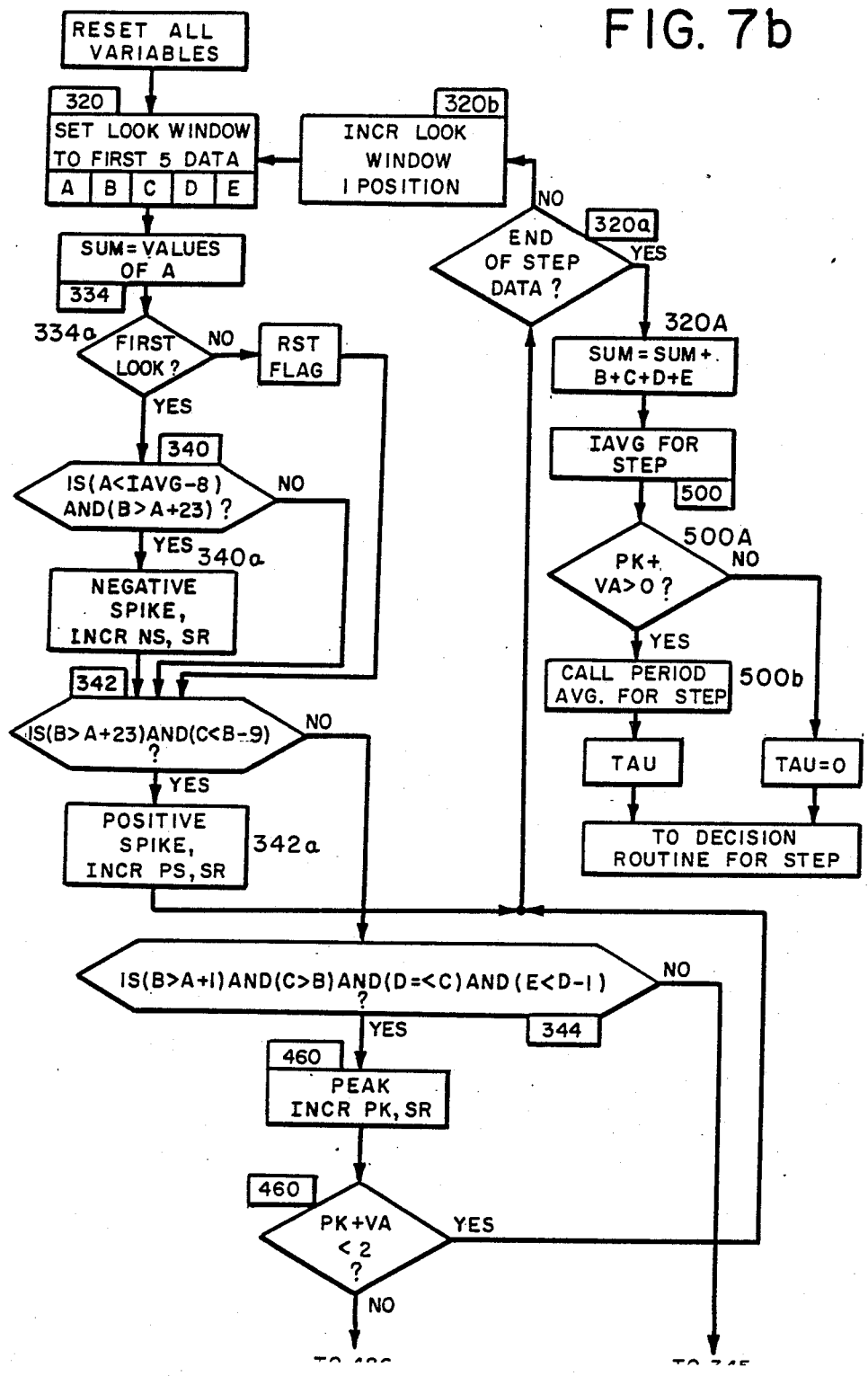
Figure 7C:
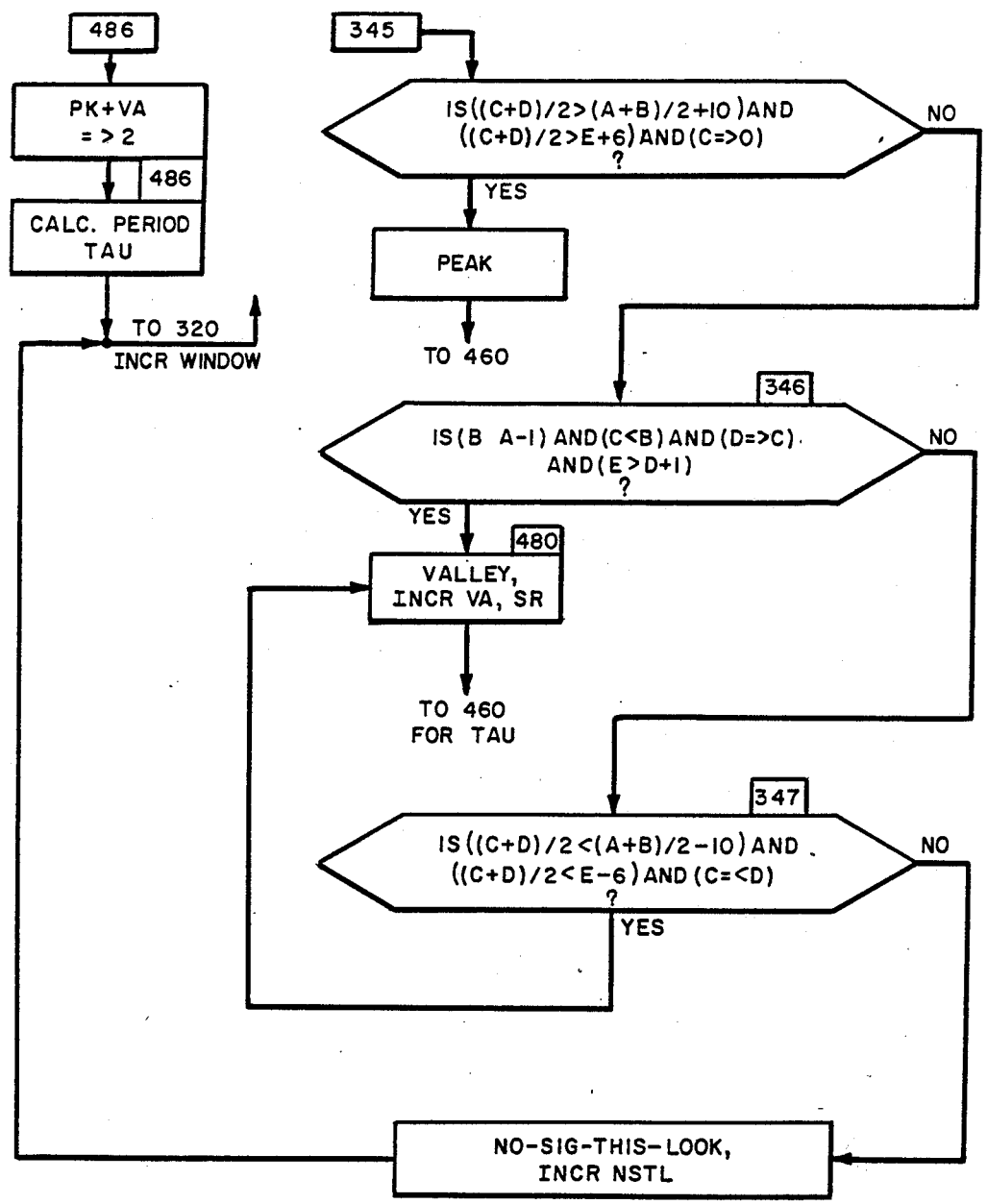

Applicant has discovered that the above method when utilized with digital techniques from the digitized analog wave form as measured, allows real time analysis of any chosen wave form in that each individual slope or difference between successive wave forms can be compared to a previously stored slope (typically represented as $S_{a-b}$, where S is the slope between Ia and Ib). This approach gives rise to the following incremental representation of certain predetermined wave form characteristics. Typically the peak, i.e., 58 (C) A step "Feature" (Ref. FIG. 7b) of wave form 55 can be determined by the following algorithm incorporating logical anding of adjacent current values;

Feature=[(Ib-Ia>Sab)]o [(Ic-Ib)>Sec]

o[(Id-Ic)>Sdc)o[(Ie-Id)>Sdc]

Those skilled in the analytical arts will again readily recognize that applicants expression provides a novel and convenient means for real time analysis of transient currents utilizing digital techniques in a high speed computer.

Utilizing the above described "Feature Analysis", concepts of current amplitude sampling on a equal time increment basis, applicant's discovery provides identification of a feature of the particular current wave of the type disclosed in FIG. 4 is (Ref. FIG. 7a) as follows;

Peak C (58)=[(b-a)>23]o[(c-b)>9]

o[(c-d)>9]o[(d-e)>25]

the amplitude values of A, B, C and D would be measured from an arbitrary reference typically yielding values shown in FIGS. 4, 5 and 6. If conditions of the algorithm are met, a peak is identified.

Although the above "feature" detects a motor current peak, typically other features can be either positive or negative slopes, or any combination of positive negative peaks, and/or sequences of peaks and/or numbers of peaks, indicating various valve shaft torque conditions as shown on FIGS. 6, 6a, 6b, 6c and 6d. As described in some detail below, time based sampling of current amplitudes and application of algorithms in the sequence shown in FIGS. 7b, 7c, 7d and 7e allow rapid and real time determination of stepmotor shaft loading conditions.

Applicants invention in the alternative, contemplates utilization of the SIGNALYSIS technique to create predetermined valve action for particular stepmotor applications involving substantially varying torque requirements such as encountered in electric door motion control. This mode of operation would establish predetermined wave forms, and adjust voltage pulses to correspond.

Applicants novel method of utilizing SIGNALYSIS in controlling stepmotor through real time analysis of stepmotor current signatures can best be described with particular reference to FIGS. 2, 3 and 4. In FIG. 2, a typical analog representation of the current drawn by a stepmotor such as a synchro step USS52 manufactured by the PMI division of Kollmorsen Motors Syosset, N.Y. (PMI) driven by a PMI driver type BSD-40 is shown. Those skilled in the control arts will readily understand that the disclosed system and control method contemplate other stepmotors including those having greater or less torque. Applicant has discovered that the stepmotor current comprises, in a repeatable and consistent manner, within the transient or oscillatory excursions, a negative spike 41, a positive peak 37, a negative valley 39, a second positive peak 38, and a second valley or negative peak 40. Those skilled in the transient current arts will readily recognize the typical logarithmic decrement in the decay of the transient amplitude as shown and that equal time increments between data samplings allow differences between these data points to be indicative of the rate-of-change or first derivatives in time of the data represented.

Applicant has further discovered that the transient of FIG. 2 is typical for a completed or "made" step of the stepmotor utilized. Applicant has also discovered as shown in FIG. 3, that for an uncompleted movement or step of the stepmotor, a recognizable and substantially different current is drawn by the stepmotor for an identical applied voltage pulse originating in the drivers 16 of the control system three described above.

As shown in FIG. 3, the missed or incomplete step comprises a similar negative spike 44, followed by a narrow positive spike 45. However, as distinctly different from the above described completed or "made" step the remaining portion of the stepmotor current transient has no defined or periodic structure. Thus the incomplete or missed step can be distinguished from the completed or "made" step by recording and noting the differences described above.

"SIGNALYSIS" including the steps of "FEATURE EXTRACTION" and "STEP ANALYSIS" comprises applicants novel and non-obvious method of real time determination and control of stepmotor operations. It should be noted that motor operation and control can be accomplished without monitoring or inputs from the motor output shaft.

With particular reference to FIGS. 3, 7 and 7a, there is shown SIGNALYSIS of the drive system of FIG. 1 wherein the above mentioned stepmotor operates a valve 28 in 90 degree rotation through a 16 to 1 gear set 26. Although many other combinations are possible, the disclosed embodiment employees a constant current voltage pulse per step. The step sequence of currents repeats every 4 steps, resulting from the A logical states of two motor windings. The combination of valve and gearing utilized therefore require 400 pulses per 90 degree rotation of the valve. Particular valve operating speed requirements result in approximately 80 steps per second. The motor chosen requires an average motor current of 1.4 DC amperes.

With particular reference to FIG. 4, there is shown a series of 4 transient current responses to a typical 4 step set provided by the voltage driver 16. In keeping with the SIGNALYSIS method of the invention, characteristic portions of the current wave are distinguished as shown for the particular load conditions indicated.

As disclosed, the characteristic portions of the current wave described above (Ref. FIGS. 2 and 3) have been assigned weighted values being representative of current thereby providing a basis of applying the SIGNALYSIS. Those skilled in the analytic arts will readily understand that other weighting techniques could be used as well. As shown, the capital letters A, B, C, D and E represent sampled weighted values of the current transient of FIG. 7a and FIG. 2, essentially corresponding to the distinguished portions of that current wave as sampled by the system of this disclosure. The sampling rate chosen, i.e., a rate of a sample each 390 micro seconds, provides adequate information for the method disclosed to represent measured currents in accurate detail.

Those skilled in the arts will readily appreciate that for other combinations of stepmotor drives and components, a wide variation in signal sampling can be utilized. For example, the alternate embodiment of this disclosure utilizing a stepmotor of substantially higher shaft torque output could use substantially decreased sample rates and still provide satisfactory control of the drive.

The SIGNALYSIS method disclosed herein proceeds as indicated in FIG. 7b wherein a flow chart for the first major portion and/or aspect of SIGNALYSIS i.e., "FEATURE EXTRACTION" is disclosed in a flow chart format. The feature extraction portion is best described with reference to FIGS. 4, 7 and 7a wherein the variables A, B, C, D and E each representing predetermined and distinguishing features of the stepmotor current transient of FIG. 2 as measured and stored above, are utilized in the SIGNALYSIS algorithm.

It should be noted that SIGNALYSIS data evaluation proceeds with the measurement and recording of weighted values of the variables A, B, C, D and E according to the time varying storage windows of FIG. 1a. Therefore, as an example, data samples shown in FIG. 4 as 54, 72, 117, and 109, and 91, corresponding to A, B, C, D and E of FIG. 4 make up the first "data window" of the SIGNALYSIS routine.

As shown in FIG. 1a, the recordal of sampled portions of subsequent current transient wave forms of the four step series of contemplated stepmotor operation and typically shown on FIG. 4, continues on and are stored in the random access memories 18, 20 and 22 of FIG. 1. Recording proceeds by typically providing 32 samples for each window (Ref. FIG. 1a) the current transient of each step thereby providing 128 total samples for each 4 transient current response to a 4 voltage pulse input as shown in FIG. 4. As shown in FIG. 1a, data is stored in time displaced "windows", with SIGNALYSIS utilizing window data in groups of A, B, C, D E as shown.

Returning to FIG. 7b, at 320 the first five data samples in the "window" are presented. At 334, value A, is accumulated as a first value in the sum of all "A's", as each data value becomes "A" in subsequent windows. By this means the sum of all data values up to the last window is obtained. At 334a, the particular analysis cycle is established as data either from initial or subsequent windows or data cycles. It should be noted that as shown above (Ref. FIG. 1a), the maximum number of cycles is 128 providing 32 data samples for each four motor pulses. At 340, a previously calculated average weighted value of the transient current is compared to value A, the negative spike, an value B the first positive going measurement of the transient 4A of Figure 4. The negative spike A is further compared to the first positive going value of the current transient B, and an arbitrary weighted value of 23. This operation establishes the first distinguished characteristic of the large negative spike A. Values disclosed i.e., 8 and 23 have been determined as essentially greater than equipment noise level guard bands, thereby preventing identification of a smaller amplitude current value which was not representative of a typical transient, resulting in identifying an improper transient.

Continuing on at 340A, the now identified negative spike is used to increment storage in 18, 20, or 22 (Ref. FIG. 1) of the (Ref. FIGS. 2, 3) negative spike 41 "NS" and a subsequent quantity "SR" shown on Figure 2 as the sum of typical transient current features during 1 step, i.e., SR equals the sum of the negative spike NS, the positive spike PS, the positive peaks PK an a valleys VA. These are shown on Figure 2 and discussed above as symbols 41, 45, 37, and 39, respectively of FIG. 2.

Returning to FIG. 7b, at 342, the B quantity of the wave form of FIG. 4 (Ref. FIG. 7a) is compared to A plus 23 and determined to be greater than 6 and less than the C quantity of FIG. 4A. As above this operation distinguishes B as either a positive spike or after analysis, at 344, A peak. If B is distinguished as a positive spike, again the PS and SR quantities are incremented at 342a. If as described above, this cycle is less than 32, the program continues on at 320 essentially repeating the above mentioned functions of 320, 334, 334a, 340, 340a, 342, 342a, and 344.

If at 320, it is determined that we have reached the maximum of 32 steps for a particular step in the four step cycle, analysis proceeds at 320a to determine the average current value of the step by adding to the sum of all A's the sampled values B, C, D, and E, of the last window, dividing by number of steps, in this case 32, to determine a weighted value of average current. This is done at 500. At 500b the time of occurrence of the of the first peak i.e., analogous to peak C of FIG. 4a, and the time of occurrence of the first valley, i.e., D of FIG. 4A are utilized to determine a first approximation to the period of the particular transient. Therefore at 500b, the number of sampled intervals between the first peak 37 and the second peak 38 of FIG. 2 are summed to provide the first period of the function in seconds. In this case, 6 samples indicate a period of 2.3 milliseconds (0.0023 SECONDS). For the case at 500A where the first peak and valley did not designate a true cycle, no period or "tau" was determined. Proceeding on at 500b either tau as determined or zero as the case may be is stored for use in the step decision portion of SIGNALYSIS.

Returning to 344 of FIG. 7b, sam-le values of A, B, C, D and E are evaluated to insure relative and proper portions of the current transients as distinguished in FIGS. 2 and 3. If an normal transient is present (i.e., having the characteristics of FIG. 2, and FIG. 4), at 460, the feature PK or 37, SR (49) are incremented for future full time analysis. At 460, the sum of features PK (37), and VA (39), are evaluated to be greater or less than 2. If it is determined that sum of the features are less than 2, the program proceeds to recycle via 320 and proceed as described above since no period can be determined at this time. If at 460 the sum of peak and valley features is determined as greater than 2 the period of the particular transient is calculated and the program proceeds to recompute as described above until 32 data values have been evaluated for a step.

Returning to operation 344, if it has been determined that the critical quantities of A, B, C, D and E are not present, at 345 each sample is again evaluated for relative magnitudes using a different algorithm, in this case using comparison of averages of A and B and of C and D. The operation at 345 determines whether a peak i.e., 37 of FIG. 2, or C of FIG. 4A, is present and if yes, then the program returns to 460 where a value for the period of the transient or tau is determined and stored. If the comparison of 345 is not achieved, at 346, evaluates the particular sample set for a valley and if a valley is present at 480 values of the valley VA 39 and feature sums i.e., SR or 49 are stored. Under these conditions, the program returns to 460 where the period or tau can now be determined from the time of occurrence of a peak and valley, and recorded for the particular data set.

If at 346 it is determined that no valley is present, a further test at 347 for a valley is performed. If a valley is determined, the program returns to 480 for additional incrementation of VA 39 and SR 49. Further processing of these values proceeds at 460 whereas above, a value of the period tau for this transient is determined and stored.

Returning to the operation at 347, should no peak or valley have been determined, at 347A the quantity SNSTL (51) i.e., sum-of-no-signal-this-look or no feature identified is created and incremented for use in the step determination portion of this SIGNALYSIS routine.

Figure 7D:
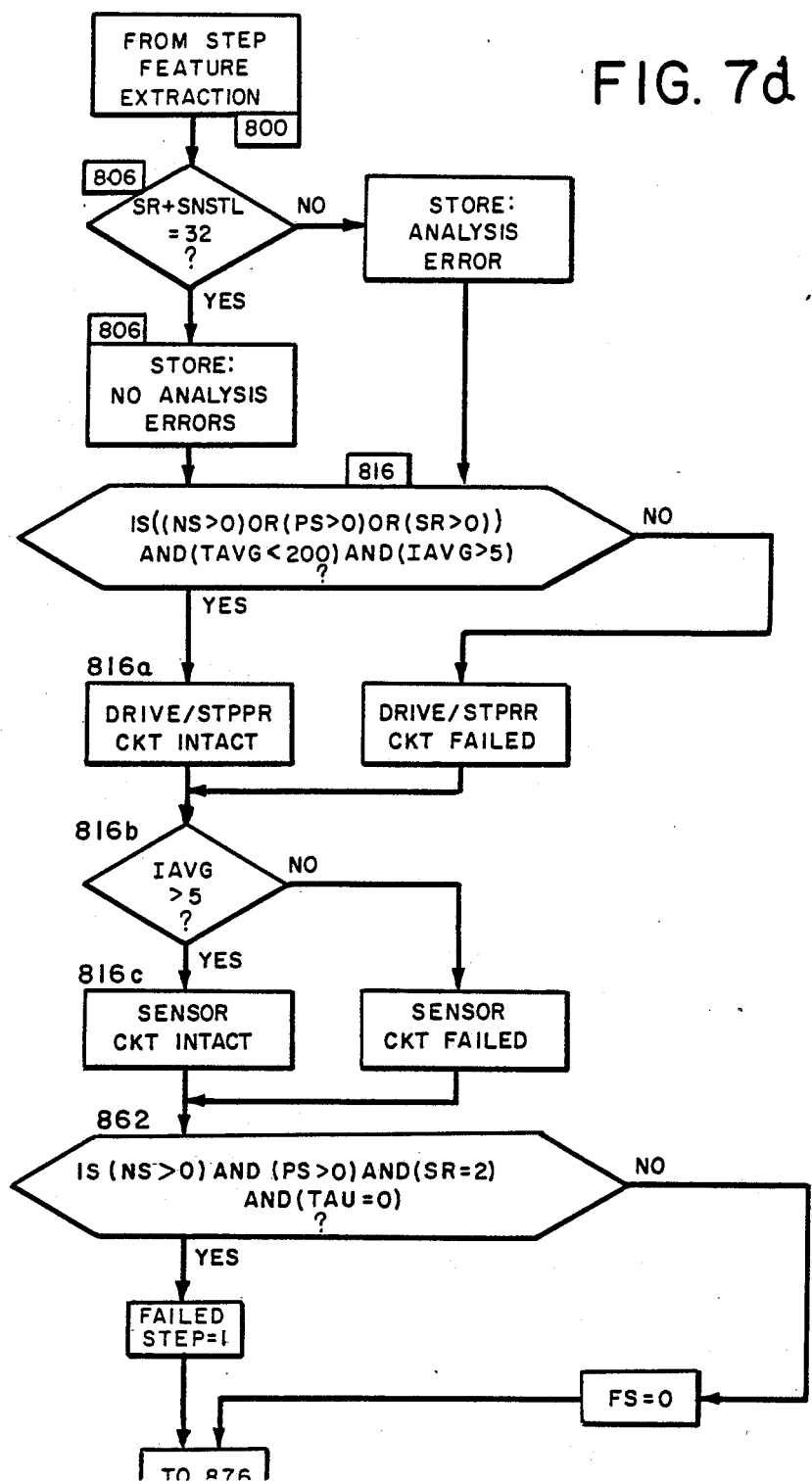
Figure 7E:
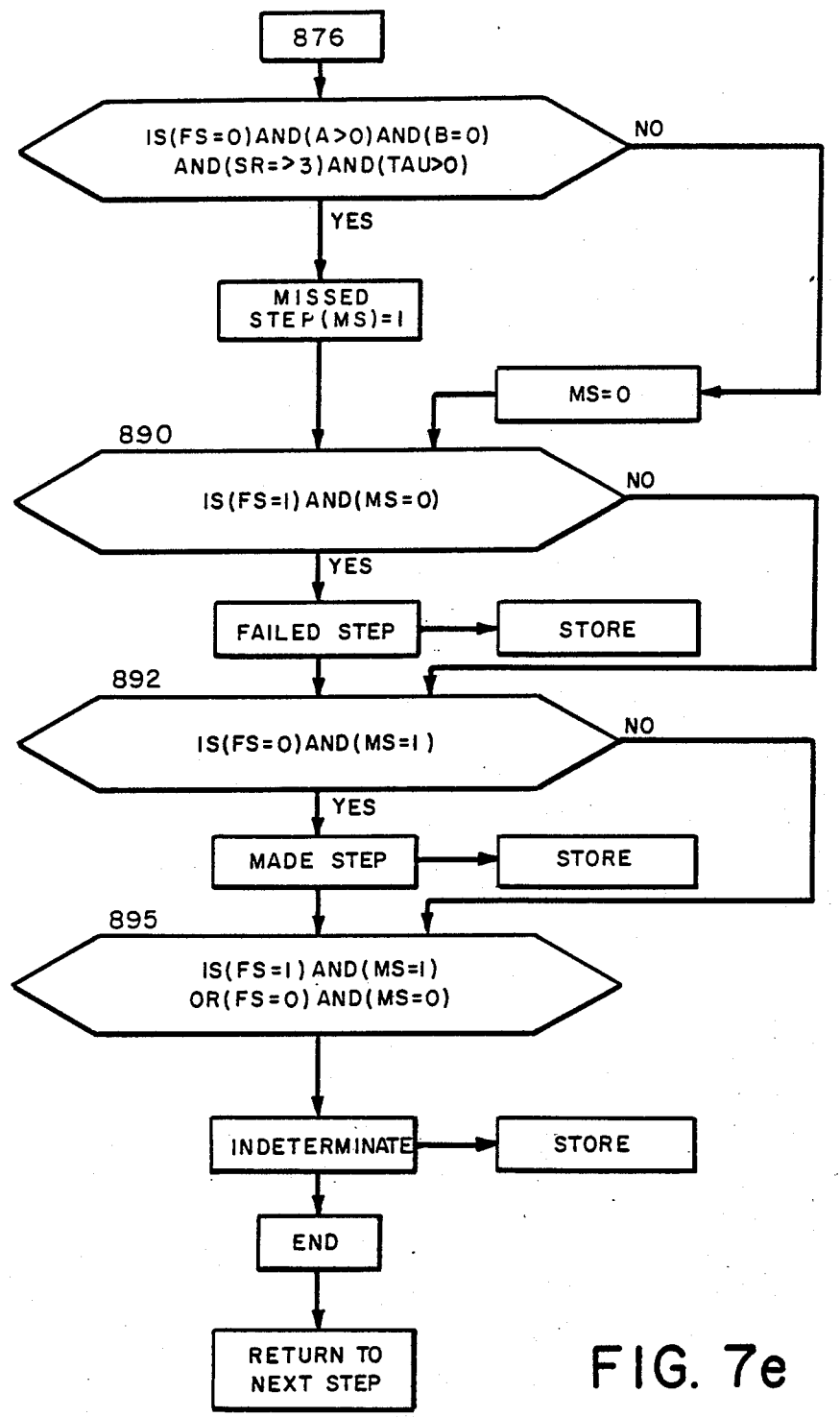

Turning now to FIGS. 7d and 7e, wherein the "step decision" analysis is disclosed, it is assumed that the values as described above from the feature extraction are available from storage i.e., NOVRAMS 18, 20 or 22. Before proceeding at 800 of FIG. 7B these features are recalled. At 806, the quantity SR (49 sum of feature values) plus the quantity 51 i.e., SNSTL are summed and compared to 32, the number of data sample "looks" for the particular current transient of a step of FIG. 4A. If the sum of the features of the feature analysis and the missed signals equals 32, at 806 the quantities determine if an analysis error has or has not occurred and this determination stored. Further evaluation of the feature analysis quantities proceeds at 816 in order to determine that the quantities of the salient features exist and the average current is between predetermined values, at 816A it is concluded that the drive circuit is intact. In 816B the existence of the average current minimum sufficiently above the noise floor indicates the sensor circuit is intact.

Returning to the operation at 862, if a negative spike NS and a positive spike PS exist and the number of features (SR) does not exceed 2 and no period is calculatable, then the logical combination of these elements establishes the factor FS (failed step)=1 if true or if not true, FS=0. In a like manner 876 establishes the factor MS(made step)=1 if true or M=0 if not true.

In 890 the factors FS and MS are logically combined to determine a failed step if FS=1 and MS=0, a made step if FS=0 and MS=1, and an indeterminate condition if FS=1 and MS=1 or if FS=0 and MS=0. The information is stored and the routine returns to the beginning, wherein the pulse for the next step may be issued to the step motor from the control system. The stored information of a made, failed, or indeterminate step and certain information as to the characteristics of the step motor, gears, and load are now available to the control system in order to make an intelligent decision on the next step command.

Although certain of the stepmotor signatures have been discussed above in relation to the "SIGNALYSIS" invention disclosed, the following description of FIGS. 4, 5, 6a, 6b, 6c, 6d, and 6e discuss the typical and a typical current signatures measured in operating the disclosed stepmotor/valve combination for operating conditions which can be detected utilizing the invention as disclosed.

FIG. 5;

Weighted values of stepmotor current for normal valve operation responsive to a four pulse input. Typical FIGS. for A, B, C, D and E, constants as described above, are also shown for two of the four wave forms.

Stepmotor currents responsive to a four step voltage pulse wherein the motor is driving the valve disclosed in the opening direction immediately after reversal. The absence of a current peak at 130 and 135 would indicate gear backlash due to the initial valve movement in the closing direction.

FIG. 6;

Transient currents responsive to a four voltage pulse application to the stepmotor/valve combination disclosed wherein a valve closure member contacted a positive stop at the end of the valve stroke. Reaction of the fourth current transient to the positive stop contact is shown by the substantially different fourth current pulse in that the negative spike 46, valley 72, peak 79, valley 75, and peak 78 are substantially reduced in amplitude since the valve closure member and drive train are tightly held against the stop.

FIG. 6a;

Current signatures of the motor/valve combination disclosed herein for valve actuation in the opening direction, the valve closure member contacting a positive stop at the open end. Signature trace at the third current peak indicates a double current peak after the normal negative spike due to the rebounding of the valve closure member after contact with a positive stop. As shown, the SIGNALYSIS portion of the invention indicates that F S equal 0 M S equal 0, S 4 equals 2, and TAU not equal to 0 indicating indeterminate or incomplete valve operation.

FIG. 6b;

Current signature of the motor/valve combination of this disclosure wherein the valve closure member is moved against a hard mid-point top in the opening direction.

As in 6a above, the second current peak after the initial negative spike indicates a double truncated peak, i.e., 95 and 96 indicating reflected energy through rebound from the positive stop. Further, the fourth current transient demonstrates an inordinate oscillatory mode indicating valve chatter after closure member contact with the positive stop.

FIG. 6c;

Current signatures of the motor/valve combination of this disclosure responsive to four voltage pulse sequence operating the valve closure member in the opening direction and contacting a resilient stop at the end of the valve closure member opening stroke.

SIGNATURE ANALYSIS indicates returned energy due to closure member contact of the resilient stop indicated by truncated double positive current peak at 104.

FIG. 6d;

Motor current signatures of the motor/valve combination disclosed for valve operation in the opening direction with the closure member contacting a resilient stop. In this case, the motor/drive gear combination was uncoupled due to rebound after contacting the resilient stop. As shown in the fourth current transient, the uncoupled motor shaft demonstrated a inordinately large oscillatory mode. SIGNALYSIS detection due to reduced log decrement and absence of uniformly decreasing valleys detects improper operation of the motor/gear/valve drive train.

FIG. 6e;

Current signature of the motor/gear/valve combination of this application during valve operation in the opening direction with the valve closure member contacting a normal valve stop at end of opening travel. Resilient stop contact shown by truncated positive peak and valley, 103 and 95 respectively.

In an alternate embodiment of the pulse driven motor/gear combination of the disclosure, in particular reference to FIG. 8, the motor/gear drive is utilized in operating an automatic passenger door for use on mass transit vehicles, such as trains, transit cars and buses.

With particular reference to FIG. 8 there is shown power operated door assembly 140 having a resilient sealing edge 142 mounted for lateral movement along a track 138. Internal of the door 140 is a vertical roller guide 134, cooperating with a drive roller 132 rotatably attached to a drive arm 130. The pulse type drive motor 124 coupled to a reducing gear 126 having an output shaft 128 drivingly engaging the opposite end of the arm 130 so as to rotate the roller 132 in an arc 136. The motor/gear combination is suitably attached to the car body adjacent to the passenger door opening by a bracket 125.

In operation, actuation of the pulse drive motor 124 provides rotational torque to the shaft 128 moving the arm 130 and more particularly its roller end 132 in an arc like motion 136. As the roller 132 is contained in a vertically disposed guide, 134 having a slot 135 for clearance of a suitable bearing shaft (not shown) connecting the roller end of the arm 130 and its roller 132. Rotation of the shaft 128 therefore, moves the roller 132 vertically in the track 134 providing movement of the door in the direction 146. Clearance of the arm 130 internal of the door 140 is provided by a slot 144 in the track 132 and in additional suitable slot in the lower edge of the door 140 (not shown).

As indicated above, SIGNALYSIS of the current drawn by the pulse motor 124 provides a substantial advantage in monitoring operations of the door 140 in that any loss of mechanical continuity between the drive motor shaft and the door 140 can be detected and appropriate remedial action taken.

Other variations in stepmotor shaft torque such as obstructions in the door path, excessive door hanger friction, will produce current transients similar to those described above for stepmotor operation of a valve. SIGNALYSIS therefore allows detection and evaluation of abnormal door operation.

It is apparent that there has been provided in accordance with the invention, method and apparatus for determining the shaft position and loading of a pulse excited stepmotor utilized in driving a variable fork load that fully satisfies the objects aims and advantages as set forth. While the inventions has been described in conjunction with a preferred embodiment wherein the stepmotor operates a modulating valve through a gear reduction system, and a stepmotor driven vehicular door operator, it is evident that many alternatives, modifications, and variations of the above mentioned preferred and alternate embodiments will be apparent to those skilled in the art in light of the foregoing description. Accordingly, it is intended to embrace all such alternatives, modifications and variations as fall within the spirit and broad scope of the appended claims.

I claim:

1. A method for determining loading of a rotary stepmotor having stator windings and a rotor driving an output shaft in incremental motion comprising the steps of:

applying predetermined number of time based voltage pulses to said stepmotor windings from a voltage source;
  defining a predetermined number of incremental motions of said stepmotor rotor corresponding to said voltage pulses, as a completed step; sampling stepmotor winding current transients resulting from application of said voltage pulses to said stepmotor windings for each said motion in said step;
  determining current excursions of said current transients for each motion in said step and normal stepmotor shaft loads;

determining critical relationships in said excursions for identifying rotor incremental motion;

establishing weighted values of said winding current transients during stepmotor operation;

computing said critical relationships using said weighted values;

comparing said weighted stepmotor operational transient values utilizing said critical relationships for identifying completed stepmotor shaft steps.

2. The method of claim 1 further including the step of establishing a constant and predetermined current limit from said voltage source when applied to said stepmotor winding.

3. Apparatus for determining the shaft loading and shaft position of a stepmotor having stator windings and a rotating shaft, comprising:

means applying predetermined time based voltage pulses to said stepmotor windings for generating current flow in said windings:

means measuring said transients in said stepmotor winding current;

means sampling said measured transients at predetermined time intervals subsequent to the initiation of said voltage pulses, for establishing relative time based values of said current transients;

means storing said sampled values;

means combining said values in predetermined groups, said groups indicative of stepmotor shaft loads;

means analyzing selected combinations of said groups for controlling stepmotor operations.

4. The apparatus of claim 3 wherein said combining and analyzing means include a micro processor.

5. The apparatus of claim 3 wherein said voltage applying means includes current limiting means.

6. In a controller for a stepmotor supplying shaft torque to a variable load of the type supplying a voltage pulse to the motor winding, sensing motor winding current responsive to said pulse and identifying motor shaft torque loading and travel, the improvement comprising;

means applying a voltage pulse of predetermined amplitude current limit and duration to said stepmotor windings;

means measuring motor winding current responsive to said voltage pulse;

means determining said current rates of change at constant time intervals;

means converting said rates of change to relative arithmetic magnitudes;

means analyzing said magnitudes for determining transient current signatures in sequential and predetermined periods, said periods in time phase with and initiated by said voltage pulse;

wherein motor current signatures corresponding to shaft torque loading and travel are identified.

7. The improvement of claim 6 wherein said analyzing means further comprises;

means predetermining motor shaft travel, torque output and corresponding current signatures;

means responsive to said signatures, said means varying said voltage pulses in accordance with said motor shaft travel and torque output, thereby controlling said shaft current and corresponding shaft torque to predetermined magnitudes.

8. The improvement of claim 7 further comprising;

means determining cumulative normal and predetermined shaft travel through identification of a series of desired predetermined signatures;

means generating a series of varying voltage pulses corresponding to said signatures;

means synchronizing said voltage pulses and shaft travel such that motor shaft torque is varied over said predetermined travel.

9. A method for determining shaft loading of a stepmotor having field windings and a magnetically driven rotor operating an output shaft, comprising the steps of:

moving said rotor through a predetermined rotation by applying time based pulses of predetermined amplitude to said stepmotor windings from a voltage source;

sampling stepmotor winding current transients resulting from application of said voltage pulses to stepmotor windings throughout said rotation in a plurality of time intervals;

measuring current excursions of said current transients in each interval for normal stepmotor shaft loads;

establishing weighted values of said winding current excursions;

identifying recurring features of said excursions for each of said intervals in said rotation;

determining critical relationships for said features, said relationships indicative of shaft loading and motion for said predetermined rotation; and, using said indications to signal completed shaft rotation.

10. The method of claim 9 further including the step of establishing a constant and predetermined current limit from said voltage source when applied to said stepmotor winding.

11. Method of claim 10 further comprising the steps of:

redefining said predetermined rotation as a plurality of steps, each said step responsive to each said pulse;

evaluating said winding current features during each said step; and identifying rotor motion for each step and signaling said identified motion for corrective action.

12. A method of claim 11 further comprising steps of:

defining said identifying and signalling steps to include rotor motion under one of the conditions of; midstep rotor obstruction, resilient end of step stop, unloaded rotor, and non-resilient rotor locking end of step stop.

* * * * *